United States Patent
Cho et al.

(10) Patent No.: US 11,366,547 B2
(45) Date of Patent: Jun. 21, 2022

(54) DISPLAY DEVICE WITH OVERLAPPED DISPLAY FRAME PERIODS AND SENSING FRAME PERIODS

(71) Applicant: SAMSUNG DISPLAY CO., LTD., Yongin-si (KR)

(72) Inventors: Hyun Wook Cho, Yongin-si (KR); Min Hong Kim, Yongin-si (KR); Tae Joon Kim, Yongin-si (KR); Jae Hyun Park, Yongin-si (KR); Jung Mok Park, Yongin-si (KR); Bo Geun Yuk, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/318,659

(22) Filed: May 12, 2021

(65) Prior Publication Data
US 2022/0093031 A1    Mar. 24, 2022

(30) Foreign Application Priority Data

Sep. 23, 2020    (KR) .................. 10-2020-0123296

(51) Int. Cl.
*G06F 3/041*        (2006.01)
*G06F 3/044*        (2006.01)

(52) U.S. Cl.
CPC ...... *G06F 3/041662* (2019.05); *G06F 3/0446* (2019.05); *G06F 3/0412* (2013.01); *G06F 3/0445* (2019.05); *G06F 2203/04101* (2013.01)

(58) Field of Classification Search
CPC ...... G06F 3/0443; G06F 3/044; G06F 3/0445; G06F 3/0416; G06F 3/041; G06F 3/0412; G06F 1/3262
See application file for complete search history.

(56) References Cited

U.S. PATENT DOCUMENTS

| | | | | |
|---|---|---|---|---|
| 8,717,325 B1* | 5/2014 | Hermes | .................. | G06F 3/044 345/173 |
| 8,963,852 B2* | 2/2015 | Matsui | ................ | G06F 3/04184 345/173 |
| 9,128,561 B2* | 9/2015 | Lee | ......................... | G06F 3/044 |
| 9,417,475 B2* | 8/2016 | Fukutome | ............. | G06F 3/0443 |
| 9,671,887 B2* | 6/2017 | Furutani | ............... | G06F 3/0448 |
| 9,847,380 B2* | 12/2017 | Yamazaki | ............. | G06F 1/1652 |
| 9,958,976 B2* | 5/2018 | Endo | ....................... | G06F 3/042 |
| 9,965,108 B2* | 5/2018 | Li | ......................... | G06F 3/0445 |

(Continued)

FOREIGN PATENT DOCUMENTS

KR    10-2022-0008994    1/2022

*Primary Examiner* — Michael J Jansen, II
(74) *Attorney, Agent, or Firm* — F. Chau & Associates, LLC

(57) ABSTRACT

A display device includes pixels to display one or more images in display frame periods and sensors overlapping with the pixels. The sensors sense one or more user inputs in sensing frame periods that are shorter in duration than the display frame periods. A first sensing frame period includes a first non-sensing period that substantially entirely overlaps with a first display frame period. A second sensing frame period includes a second non-sensing period that overlaps with a portion of the first display frame period and a portion of a second display frame period. The first non-sensing period and the second non-sensing period have different durations.

20 Claims, 14 Drawing Sheets

(56) References Cited

U.S. PATENT DOCUMENTS

| | | | |
|---|---|---|---|
| 9,990,080 B2* | 6/2018 | Shin | G02F 1/1368 |
| 10,108,302 B2* | 10/2018 | Huang | G06F 3/0443 |
| 10,146,365 B2* | 12/2018 | Takahashi | G06F 3/041662 |
| 10,185,421 B2* | 1/2019 | Kim | G06F 3/047 |
| 10,222,885 B2* | 3/2019 | Lee | G06F 3/0446 |
| 10,324,324 B2* | 6/2019 | Kim | G06F 3/04166 |
| 10,365,773 B2* | 7/2019 | Yousefpor | G06F 3/041661 |
| 10,429,967 B2* | 10/2019 | Cho | G06F 3/0446 |
| 10,613,682 B2* | 4/2020 | Stevenson | G06F 3/041662 |
| 10,712,867 B2* | 7/2020 | Li | G06F 3/044 |
| 10,739,919 B2* | 8/2020 | Moon | G06F 3/0412 |
| 10,871,845 B2* | 12/2020 | Park | G06F 3/0418 |
| 11,016,616 B2* | 5/2021 | Sauer | G06F 3/044 |
| 11,054,926 B2* | 7/2021 | Kim | G06F 3/0443 |
| 2012/0044180 A1* | 2/2012 | Matsui | G06F 3/04184 |
| | | | 345/173 |
| 2013/0069894 A1* | 3/2013 | Chen | G06F 3/04184 |
| | | | 345/173 |
| 2013/0314343 A1* | 11/2013 | Cho | G06F 3/0446 |
| | | | 345/173 |
| 2014/0071066 A1* | 3/2014 | Lee | G06F 3/0446 |
| | | | 345/173 |
| 2014/0160065 A1* | 6/2014 | Zhang | G06F 3/0418 |
| | | | 345/174 |
| 2014/0240617 A1* | 8/2014 | Fukutome | G06F 3/0443 |
| | | | 349/12 |
| 2014/0347297 A1* | 11/2014 | Tsuji | G06F 3/04184 |
| | | | 345/173 |
| 2015/0130749 A1* | 5/2015 | Binstead | G06F 3/0443 |
| | | | 345/174 |
| 2015/0144920 A1* | 5/2015 | Yamazaki | G06F 3/0446 |
| | | | 257/40 |
| 2015/0185941 A1* | 7/2015 | Lee | G06F 3/0443 |
| | | | 345/173 |
| 2015/0331535 A1* | 11/2015 | Li | G06F 3/0445 |
| | | | 348/174 |
| 2015/0363016 A1* | 12/2015 | Furutani | G06F 3/04164 |
| | | | 345/173 |
| 2016/0162074 A1* | 6/2016 | Huang | G06F 3/0443 |
| | | | 345/174 |
| 2016/0283023 A1* | 9/2016 | Shin | G06F 3/04182 |
| 2016/0370940 A1* | 12/2016 | Zhao | G06F 3/04184 |
| 2017/0090619 A1* | 3/2017 | Yousefpor | G06F 3/041661 |
| 2017/0090630 A1* | 3/2017 | Kim | G06F 3/047 |
| 2017/0131829 A1* | 5/2017 | Takahashi | G06F 3/04182 |
| 2017/0177130 A1* | 6/2017 | Endo | G06F 1/1643 |
| 2017/0329167 A1* | 11/2017 | Kim | G06F 3/0443 |
| 2018/0095576 A1* | 4/2018 | Yokoo | G06F 3/0412 |
| 2018/0275824 A1* | 9/2018 | Li | G06F 3/03547 |
| 2019/0034028 A1* | 1/2019 | Stevenson | G06F 3/04186 |
| 2019/0056819 A1* | 2/2019 | Moon | G06F 3/0412 |
| 2019/0385551 A1* | 12/2019 | Kim | G06F 3/04184 |
| 2020/0103992 A1* | 4/2020 | Sauer | G06F 3/04184 |
| 2020/0201468 A1* | 6/2020 | Park | G06F 3/0418 |
| 2020/0210011 A1* | 7/2020 | Kim | G06F 3/04166 |
| 2020/0341585 A1* | 10/2020 | Li | G06F 3/041662 |
| 2022/0020333 A1 | 1/2022 | Cho et al. | |

* cited by examiner

DISPLAY DEVICE WITH OVERLAPPED DISPLAY FRAME PERIODS AND SENSING FRAME PERIODS

CROSS-REFERENCE TO RELATED APPLICATION

The present application claims priority under 35 U.S.C. § 119(a) to Korean patent application 10-2020-0123296, filed on Sep. 23, 2020, in the Korean Intellectual Property Office, the entire disclosure of which is incorporated by reference.

BACKGROUND

1. Field of the Invention

One or more embodiments described herein relate to a display device.

2. Background of the Related Art

Many forms of consumer electronics have display devices. Examples include liquid crystal display devices and organic light emitting display devices. These devices may include a display unit for displaying images and a sensor unit for sensing touch positions. The sensor unit may overlap with the display unit on a plane. Accordingly, in some cases, sensing signals from the sensor unit may interfere with display signals. This may occur, for example, when the sensing frame rate of the sensor unit is not in accordance (or otherwise compatible) with the display frame rate of the display unit. When this happens, various aberrant effects (e.g., horizontal strip patterns) may become visible to reduce display quality.

SUMMARY

One or more embodiments may reduce or prevent aberrant visual effects from occurring in a display device, even when a sensing frame rate and a display frame rate of the device are not in accordance with each other. Examples of these effects include, but are not limited to, flowing horizontal strip patterns.

In accordance with one or more embodiments, a display device includes pixels configured to display one or more images in display frame periods and sensors overlapping with the pixels. The sensors are configured to sense one or more user inputs in sensing frame periods shorter in duration than the display frame periods. Each of the sensing frame periods include sensing periods in which sensing signals are supplied to the sensors and non-sensing periods in which the sensing signals are not supplied to the sensors. A first sensing frame period includes a first non-sensing period that substantially entirely overlaps with a first display frame period. A second sensing frame period includes a second non-sensing period that overlaps with a portion of the first display frame period and a portion of a second display frame period. The first non-sensing period and the second non-sensing period are of different durations.

In accordance with one or more embodiments, a display device includes pixels configured to display one or more images in display frame periods and sensors overlapping with the pixels. The sensors are configured to sense one or more user inputs in sensing frame periods shorter in duration than the display frame periods. Each of the sensing frame periods include sensing periods in which sensing signals are supplied to the sensors and non-sensing periods in which the sensing signals are not supplied to the sensors. A first sensing frame period includes a first non-sensing period that substantially entirely overlaps with a first display frame period. A second sensing frame period includes a second non-sensing period that entirely or substantially overlaps with the first display frame period. The second non-sensing period is a last non-sensing period of the first display frame period, and the first non-sensing period and the second non-sensing period have different durations.

In accordance with one or more embodiments, an apparatus includes a first driver configured to control a display panel in display frame periods; and a second driver configured to control a touch sensor in sensing frame periods. A first sensing frame period includes a first non-sensing period that substantially entirely overlaps with a first display frame period. A second sensing frame period includes a second non-sensing period that overlaps with a portion of the first display frame period and a portion of a second display frame period. The first non-sensing period and the second non-sensing period are of different durations.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
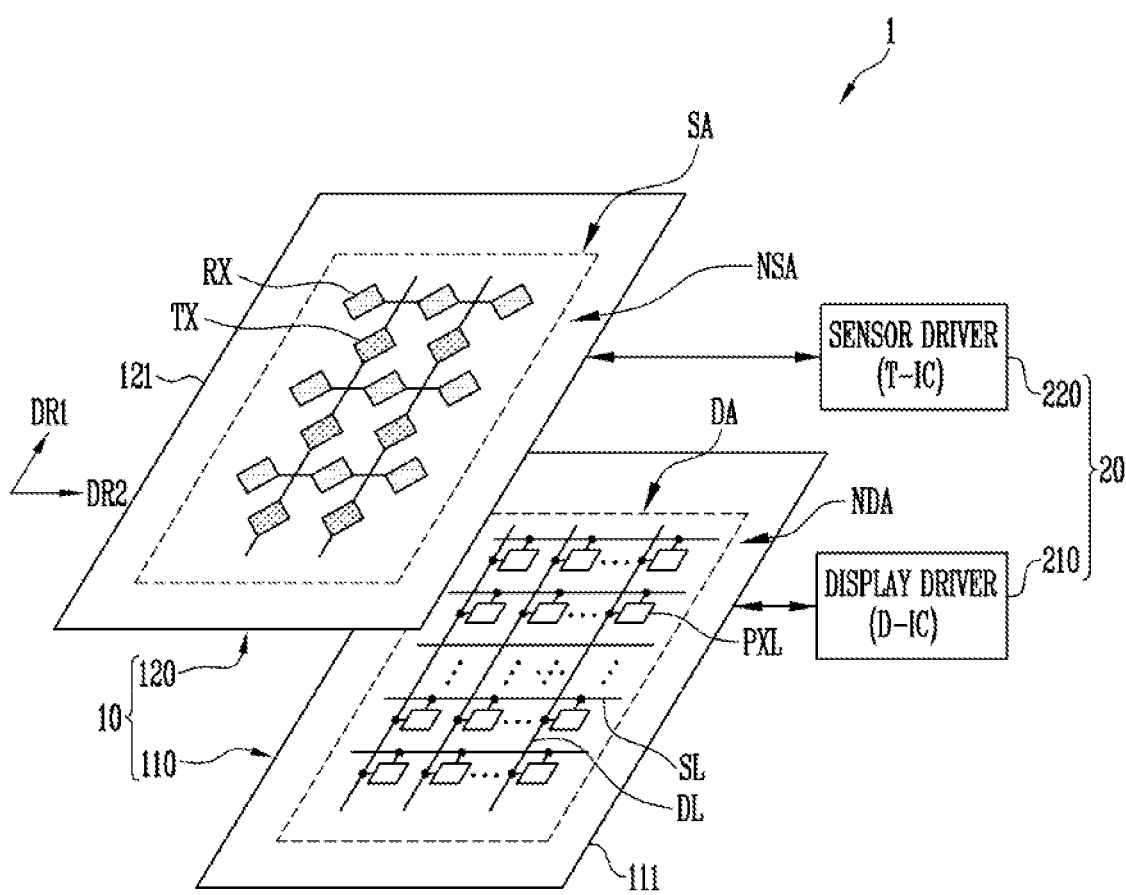
FIG. 1 illustrates an embodiment of a display device.

Hereinafter, embodiments are described in detail with reference to the accompanying drawings so that those skilled in the art may easily practice the present disclosure. The present disclosure may be implemented in various different forms and is not limited to the embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions. In description, the expression "equal" may mean "substantially equal." That is, this may mean equality to a degree to which those skilled in the art can understand the equality. Other expressions may be expressions in which "substantially" is omitted.

FIG. 1 is a diagram illustrating an embodiment of display device 1 which may include a panel 10 and a driving circuit 20 for driving the panel 10. The panel 10 may include, for example, a display unit 110 (e.g., display panel) that displays images and a sensor unit 120 (e.g., touch sensor) that may sense inputs generated, for example, based on a touch, pressure, fingerprint, hovering, or other form of input. The panel 10 may also include pixels PXL and sensors. The sensors may include first sensors TX and second sensors RX overlapping with at least some of the pixels PXL.

The driving circuit 20 may include a display driver 210 for driving the display unit 110 and a sensor driver 220 for driving the sensor unit 120. For example, the pixels PXL may display images in units based on a display frame period. For example, the sensors TX and RX may sense an input of a user in units based on a sensing frame period, which, for example, may be different from (e.g., shorter than) the display frame period.

In some embodiments, the display unit 110 and the sensor unit 120 may be separately manufactured and disposed and/or coupled to overlap with each other in at least one area thereof. In one embodiment, the display unit 110 and the sensor unit 120 may be integrally manufactured. For example, the sensor unit 120 may be directly formed on at least one substrate (e.g., an upper substrate and/or a lower substrate of a display panel, or a thin film encapsulation), an insulating layer, or one or more types of functional layers (e.g., an optical layer or a protective layer).

In the embodiment of FIG. 1, sensor unit 120 is on a front surface (e.g., an upper surface on which images are displayed) of the display unit 110. However, the sensor unit 120 may be disposed in one or more different locations in another embodiment. For example, in one embodiment, the sensor unit 120 may be on a rear surface or multiple (e.g., upper and rear) surfaces of the display unit 110. In one embodiment, the sensor unit 120 may be disposed in at least one edge area of the display unit 110

The display unit 110 may include a display substrate 111 and a plurality of pixels PXL on the display substrate 111. The pixels PXL may be disposed in a display area DA of the display substrate 111.

The display substrate 111 may include the display area DA that displays images and a non-display area NDA at a periphery of the display area DA. In some embodiments, the display area DA may be in a central area of the display unit 110, and the non-display area NDA may be at an edge area of the display unit 110 partially or fully surrounding the display area DA. Additionally, the display substrate 111 may be a rigid or flexible substrate made from various and the material(s) or properties. For example, the display substrate 111 may be a rigid substrate including glass or tempered glass, or may be a flexible substrate including a thin film of plastic or metal.

Scan lines SL and data lines DL, and the pixels PXL connected to the scan lines SL and the data lines DL, are disposed in the display area DA. The pixels PXL may be selected by a scan signal of a first (e.g., turn-on) level, which scan signal is supplied from the scan lines SL. The scan signal may be supplied with a data signal from the data lines DL to emit light with a luminance corresponding to the data signal. When taken in aggregate, the light emitted from the pixels PXL may display an image in the display area DA corresponding to the data signals supplied to respective ones of the pixels PXL. The structure, driving method, and the like, of the pixels PXL may vary among embodiments. Also, the pixels PXL may be implemented to have various structures and/or various driving methods among embodiments.

The non-display area NDA may include various types of lines and/or built-in circuit(s) connected to the pixels PXL of the display area DA. In an example, a plurality of lines for supplying one or more power sources and/or various control signals to the display area DA may be disposed in the non-display area NDA. In one embodiment, a scan driver (as well as other logic) may be further disposed in the non-display area NDA.

Additionally, the display unit 110 may vary among embodiments. For example, the display unit 110 may be implemented as a self-luminescent type of display panel, an example of which is an organic light emitting display panel. In one embodiment, the display unit 110 may be implemented as a non-luminescent type display panel, an example of which is a liquid crystal display panel. When the display unit 110 is implemented as a non-luminescent type of display panel, the display device 1 may additionally have or be coupled with a light source, e.g., a backlight unit.

The sensor unit 120 includes a sensor substrate 121 and a plurality of sensors TX and RX on the sensor substrate 121, e.g., the sensors TX and RX may be disposed in a sensing area SA on the sensor substrate 121. The sensing area SA may operate to sense, for example, a touch input, and a peripheral area NSA may be at a periphery of the sensing area SA. In some embodiments, the sensing area SA may correspond to the display area DA (e.g., an area overlapping with the display area DA). One or more peripheral circuits in the peripheral area NSA may correspond to the non-display area NDA (e.g., an area overlapping with the non-display area NDA). When a touch input (or the like) is provided on the display area DA, the touch input may be detected through the sensor unit 120.

The sensor substrate 121 may be a rigid or flexible substrate, and in some embodiments may be configured with at least one insulating layer. In one embodiment, the sensor substrate 121 may be a transparent or translucent light transmission substrate, but the present disclosure is not limited thereto. Also, the material(s) and properties of the sensor substrate 121 may vary among embodiments. For example, the sensor substrate 121 may be a rigid substrate configured with glass or tempered glass, or a flexible substrate configured with a thin film made of plastic or metal. In some embodiments, at least one substrate (e.g., the display substrate 111, an encapsulation substrate, and/or a thin film encapsulation) corresponding to the display unit 110, or at least one insulating layer, at least one functional layer, and/or other layers, which are disposed at the inside and/or outer surface of display unit 110, may be used as the sensor substrate 121.

The sensing area SA may include an area (e.g., an active area of a sensor) which is responsive to a touch input. To this end, a plurality of sensors for sensing a touch input, etc., may be disposed in the sensing area SA. In some embodiments, the plurality of sensors may include one or more first sensors TX and one or more second sensors RX.

The first sensors TX may extend, for example, in a first direction DR1 and may be arranged in a second direction DR2. The second direction DR2 may be different from the first direction DR1, e.g., the second direction DR2 may be a direction orthogonal to the first direction DR1. In one embodiment, the extending direction and arrangement direction of the first sensors TX may be based on the location and/or arrangement of one or more other components of the display device or may correspond to a predetermined arrangement or configuration, such as, for example, when disposed on a wearable (e.g., wrist-worn) configuration of the display device 1.

Each of the first sensors TX may be provided in a form in which first cells (having a relatively wide area) and first bridges (having a relatively narrow area) are connected to each other. An example is illustrated in FIG. 1 where the first cells have a diamond shape, but all or a portion of the first cells may have different shapes in another embodiment. Examples include a circular shape, a quadrangular shape, a triangular shape, and a mesh shape. The first bridges may be integrally formed on the same layer as the first cells or may be formed in a layer different from that of the first cells, to electrically connect adjacent first cells.

Each of the second sensors RX may extend, for example, in the second direction DR2 and may be arranged in the first direction DR1. In one embodiment, the extending direction and the arrangement direction of the second sensors RX may be based on the arrangement and/or configuration of one or more components of the display device. Each of the second sensors RX may be in a form in which second cells (having a relatively wide area) and second bridges (having a relatively narrow area) are connected to each other. An example is illustrated in FIG. 1 where each of the second cells has a diamond shape. The second cells may be configured to have different shapes in other embodiments. Examples include a circular shape, a quadrangular shape, a triangular shape, and a mesh shape. The second bridges may be integrally formed on the same layer as the second cells or may be formed in a layer different from that of the second cells, to electrically connect adjacent second cells.

In some embodiments, each of the first sensors TX and the second sensors RX may include at least one of a metal material, a transparent conductive material, or other types of conductive materials. Examples of metal materials include gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. Examples of transparent conductive material include silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like. In addition, the first sensors TX and the second sensors RX may include at least one of various other conductive materials, to have conductivity.

The first sensors TX and the second sensors RX may be configured to have a predetermined pattern, e.g., a mesh shape. Also, each of the first sensors TX and the second sensors RX may be provided as a single layer or a multilayer, and a sectional structure of each of the first sensors TX and the second sensors RX may vary among embodiments.

The sensor line(s) for electrically connecting the sensors TX and RX to the sensor driver 200 and/or other components may be disposed, with a predetermined density and/or arrangement, in the peripheral area NSA of the sensor unit 120.

The driving circuit 20 may include the display driver 210 for driving the display unit 110 and the sensor driver 220 for driving the sensor unit 120. The display driver 210 and the sensor driver 220 may be configured as Integrated Chips (ICs) separate from each other or, for example, at least a portion of the display driver 210 and at least a portion of the sensor driver 220 may be integrated together in one IC.

The display driver 210 is electrically connected to the display unit 110 to drive the pixels PXL, and may include a data driver 12 and a timing controller 11. In one embodiment, a scan driver 13 and a data divider 15 may be separately mounted in the non-display area NDA of the display 110 (e.g., see FIG. 2). In one embodiment, the display driver 210 may include all or at least some of the data driver 12, the timing controller 11, the scan driver 13, or the data divider 15.

The sensor driver 220 is electrically connected to the sensor unit 120 to drive the sensor unit 120, and may include a sensor transmitter and a sensor receiver. In one embodiment, the sensor transmitter and the sensor receiver may be integrated in one IC, but may be provided in separate ICs in another embodiment.

Figure 2:
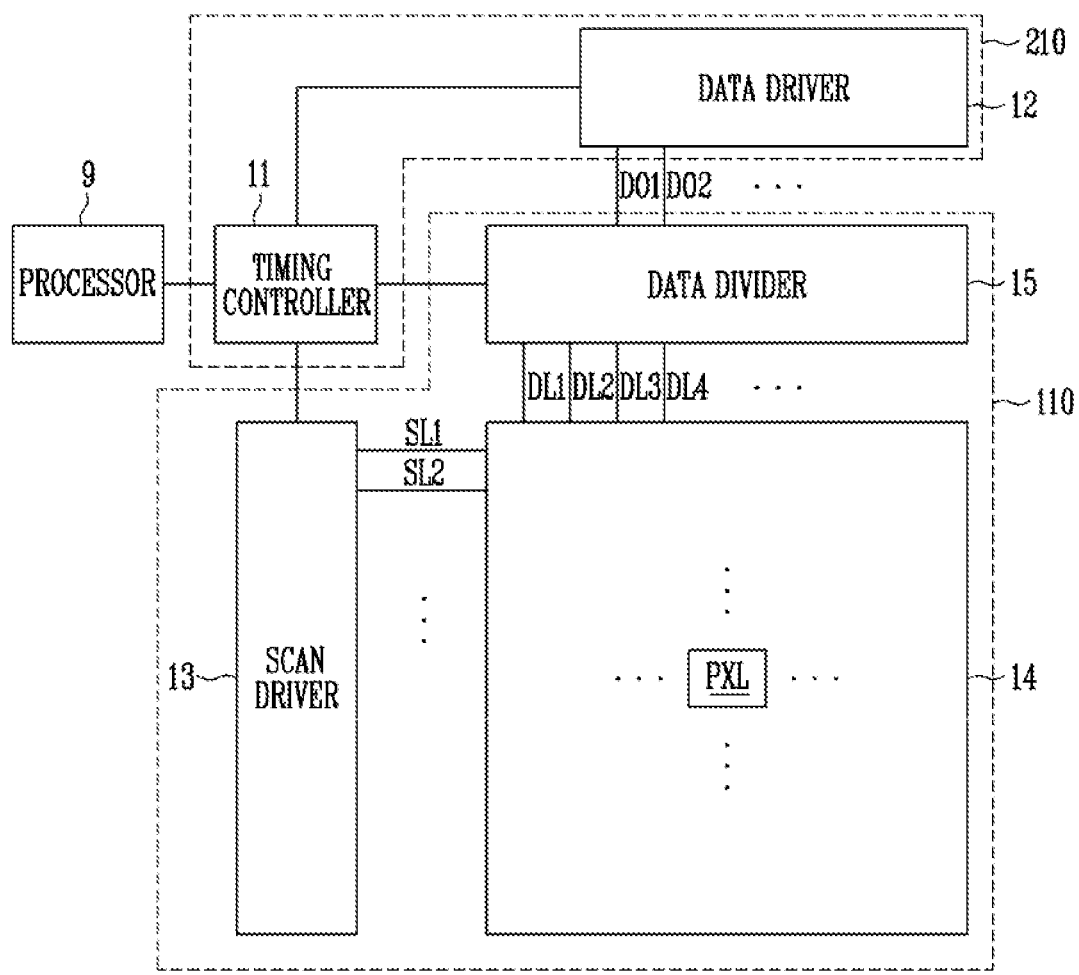
FIG. 2 illustrates an embodiment of a display unit and a display driver.

FIG. 2 is a diagram illustrating an embodiment of a display unit 110 and a display driver 210. Referring to FIG. 2, the display driver 210 may include a data driver 12 and a timing controller 11, and the display unit 110 may include a scan driver 13 and a data divider 15. As described above, whether these units are to be integrated in one IC or separately in a plurality of ICs, and/or are mounted on the display substrate 111 may be vary among embodiments of the display device 1. In one embodiment, the display device 1 may also have or be coupled to a processor 9, which, for example, may include a Graphics Processing Unit (GPU), a Central Processing Unit (CPU), and/or an Application Processor (AP).

The timing controller 11 may receive data and/or other information indicative of grayscale values for each frame and one or more control signals from the processor 9. Examples of the control signals may include a vertical synchronization signal, a horizontal synchronization signal, a data enable signal, and/or one or more other types of control signals depending, for example, on the type and configuration of the display device 1.

In one embodiment, the period(s) of the vertical synchronization signal may correspond to display frame periods. For example, when the vertical synchronization signal has a first (e.g., logic high) level, the vertical synchronization signal may indicate an active period of a corresponding frame period. When the vertical synchronization signal has a second (e.g., logic low) level, the vertical synchronization signal may indicate a blank period of a corresponding frame period. The period(s) of the horizontal synchronization signal may respectively correspond to horizontal periods. The data enable signal may have an enable level (e.g., a logic high level) while grayscale values are supplied from the processor 9 and a disable level (e.g., a logic low level) while the grayscale values are not supplied.

The timing controller 11 may render grayscale values to correspond to specifications of the display device 1. For example, the processor 9 may provide a red grayscale value, a green grayscale value, and a blue grayscale value with respect to each unit dot. In one embodiment, a pixel unit 14 may have an RGB structure. In this case, a one-to-one correspondence may exist between the pixels and respective ones of the grayscale values. Therefore, it may be unnecessary to render the grayscale values. In one embodiment, the pixel unit 14 may have a different structure, e.g., a pentile structure. In this case, adjacent unit dots may share a pixel. Hence, there may not be a one-to-one correspondence between the pixels and the grayscale values. Accordingly, the grayscale values may be rendered. Whether rendered or unrendered, the grayscale values may be provided to the data driver 12, and the timing controller 11 may provide a data control signal to the data driver 12 and a scan control signal to the scan driver 13.

The data driver 12 may generate data signals to be provided to data output lines DO1, DO2, . . . using the grayscale values and the data control signal, which are received from the timing controller 11. For example, the data driver 12 may provide first data signals to the data output lines DO1, DO2, . . . during a first period, second data signals to the data output lines DO1, DO2, . . . during a second period after the first period, third data signals to the data output lines DO1, DO2, . . . during a third period after the second period, and fourth data signals to the data output lines DO1, DO2, . . . during a fourth period after the third period.

The scan driver 13 may generate scan signals to be provided to scan lines SL1, SL2, . . . using a clock signal, a scan start signal, and/or another type of signal received from the timing controller 11. The scan driver 13 may sequentially supply the scan signals having a pulse of a first (e.g., turn-on) level to the scan lines SL1, SL2, . . . . For example, the scan driver 13 may supply the scan signals of the turn-on level to the scan lines in a period corresponding to a cycle of the horizontal synchronization signal.

The scan driver 13 may include scan stages, for example, configured in the form of shift registers. In one embodiment, the scan driver 13 may generate the scan signals in a manner that sequentially transfers the scan start signal (e.g., in the form of a pulse of a turn-on level) to a next scan stage under the control of the clock signal.

The pixel unit 14 includes pixels PXL, each of which may be connected to a corresponding data line and a corresponding scan line. The pixels PXL may include pixels emitting light of a first color, pixels emitting light of a second color, and pixels emitting light of a third color. The first color, the second color, and the third color may be different colors, e.g., red, green, and blue. In one embodiment, the different colors may include magenta, cyan, and yellow, or another combination of colors.

The data divider 15 may selectively connect the data output lines DO1, DO2, . . . and data lines DL1, DL2, DL3, DL4, . . . . The number of data lines DL1, DL2, DL3, DL4, . . . may be greater than the number of data output lines DO1, DO2, . . . . For example, the number of the data lines DL1, DL2, DL3, DL4, . . . may be an integer multiple of the number of data output lines DO1, DO2, . . . . The data divider 15 may be, for example, a demultiplexer.

The ratio of the data output lines DO1, DO2, . . . to the data lines DL1, DL2, DL3, DL4, . . . may be predetermined, e.g., a ratio 1:2 or a different ratio. In one embodiment, the data divider 15 may alternately connect the data output lines DO1, DO2, . . . to odd-numbered data lines or even-numbered data lines. For example, the data divider 15 may connect the data output lines DO1, DO2, . . . to first data lines DL1, DL3, . . . during the first period, may connect the data output lines DO1, DO2, . . . to second data lines DL2, DL4, . . . during the second period, may connect the data output lines DO1, DO2, . . . to the first data lines DL1, DL3, . . . during the third period, and may connect the data output lines DO1, DO2, . . . to the second data lines DL2, DL4, . . . during the fourth period. The data divider 15 may connect the data output lines DO1, DO2, . . . to the data lines in a different manner in another embodiment.

Figure 3:
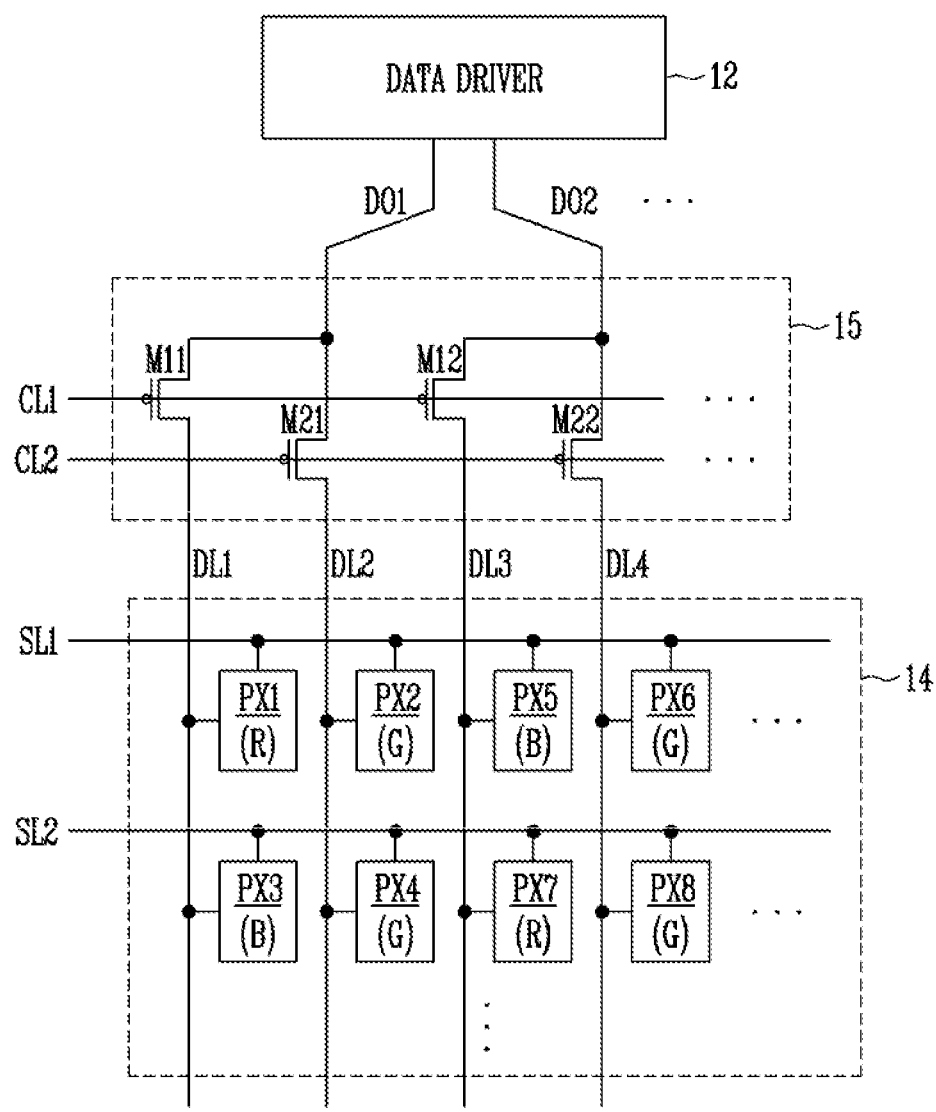
FIG. 3 illustrates an embodiment of a pixel unit and a data divider.
Figure 4:
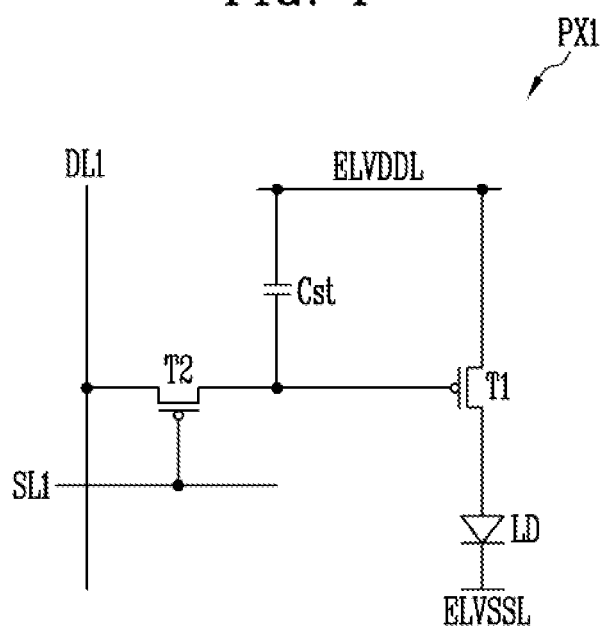
FIG. 4 illustrates an embodiment of a pixel.

FIG. 3 is a diagram illustrating an embodiment of a pixel unit 14 and a data divider 15, and FIG. 4 is a diagram illustrating an embodiment of a pixel PXL.

Referring to FIG. 3, the data divider 15 may include first transistors M11, M12, . . . and second transistors M21, M22, . . . . Gate electrodes of the first transistors M11, M12, . . . may be connected to a first control line CL1. First electrodes of the first transistors M11, M12, . . . may be connected to data output lines DO1, DO2, . . . . Second electrodes of the first transistors M11, M12, . . . may be connected to first data lines DL1, DL3, . . . . Gate electrodes of the second transistors M21, M22, . . . may be connected to a second control line CL2. First electrodes of the second transistors M21, M22, . . . may be connected to the data output lines DO1, DO2, . . . . Second electrodes of the second transistors M21, M22, . . . may be connected to second data lines DL2, DL4, . . . . The data divider 15 may be, for example, a demultiplexer having a predetermined input/output ratio, e.g., a ratio of input to output of 1:2 or another ratio.

In one embodiment, a first (e.g., turn-on) period of the first transistors M11, M12, . . . and a first (e.g., turn-on) period of the second transistors M21 and M22 may not overlap with each other. The timing controller 11 may provide control signals of a first (e.g., turn-on) level to the first and second control lines CL1 and CL2, so that the first transistors M11, M12, . . . and the second transistors M21 and M22, . . . are alternately turned on.

In one embodiment, the number of the first transistors M11, M12, . . . and the number of the second transistors M21, M22, . . . may be the same. In addition, the number of the first data lines DL1, DL3, . . . and the number of the second data lines DL2, DL4, . . . may be the same. Also, the first data lines DL1, DL3, . . . and the second data lines DL2, DL4, . . . may be the same. These numbers may be different, however, in another embodiment.

In one embodiment, the first data lines DL1, DL3, . . . and the second data lines DL2, DL4, . . . may be arranged in a predetermined pattern, e.g., to alternate with each other. For example, the pixel unit 14 may include pixels PX1, PX2, PX3, PX4, PX5, PX6, PX7, PX8, . . . arranged in a pentile structure. The first pixels PX1, PX2, PX5, PX6, . . . may be connected to a first scan line SL1 and may be configured such that a predetermined combination of colors (e.g., red, green, blue and green) are sequentially repeated along an extending direction of the first scan line SL1. Also, the first pixels PX1, PX2, PX5, PX6, . . . may be connected to different data lines DL1, DL2, DL3, DL4, . . . .

Second pixels PX3, PX4, PX7, PX8, . . . may be connected to a second scan line SL2 and may be configured such that a predetermined combination of colors (e.g., blue, green, red, and green) are sequentially repeated along an extending direction of the second scan line SL2. Also, the second pixels PX3, PX4, PX7, PX8, . . . may be connected to different data lines DL1, DL2, DL3, DL4, . . . .

In one embodiment, red and blue pixels may be connected to a first data line DL1 such that the red and blue pixels are sequentially repeated along an extending direction of the first data line DL1. Green pixels may be sequentially connected to second data lines DL2 and DL4 along an extending direction of the second and fourth data lines DL2 and DL4. Blue and red pixels may be connected to a first data line DL3 such that the blue and red pixels are sequentially repeated along an extending direction of the third data line DL3.

Referring to FIG. 4, an example first pixel PX1 is illustrated and may be representative of other pixels PX2, PX3, PX4, PX5, PX6, PX7, PX8, . . . in terms of their configuration. The first pixel PX1 may include a transistor T1, a transistor T2, and a storage capacitor Cst. The transistor T1 may have a gate electrode connected to a second electrode of a storage capacitor Cst, a first electrode connected to the first power line ELVDDL, and a second electrode connected to an anode of a light emitting diode LD. The transistor T1 may be referred to as a driving transistor.

The transistor T2 may have a gate electrode connected to the first scan line SL1, a first electrode connected to the first data line DL1, and a second electrode connected to the second electrode of the storage capacitor Cst. The transistor T2 may be referred to as a scan transistor.

The storage capacitor Cst may have a first electrode connected to the first power line ELVDDL, and the second electrode of the storage capacitor Cst may be connected to the gate electrode of the transistor T1.

The light emitting diode LD may have its anode connected to the second electrode of the transistor T1 and a cathode connected to a second power line ELVSSL. During an emission period of the light emitting diode LD, a first power voltage applied to the first power line ELVDDL may be different from (e.g., greater than) a second power voltage of the second power line ELVSSL. In one example implementation, the transistors T1, T2, M11, M12, . . . , M21, M22, . . . may be implemented with P-type transistors, but all or a portion of these transistors may be implemented as N-type transistors which operate based on a reversed phase of a signal.

Figure 5:
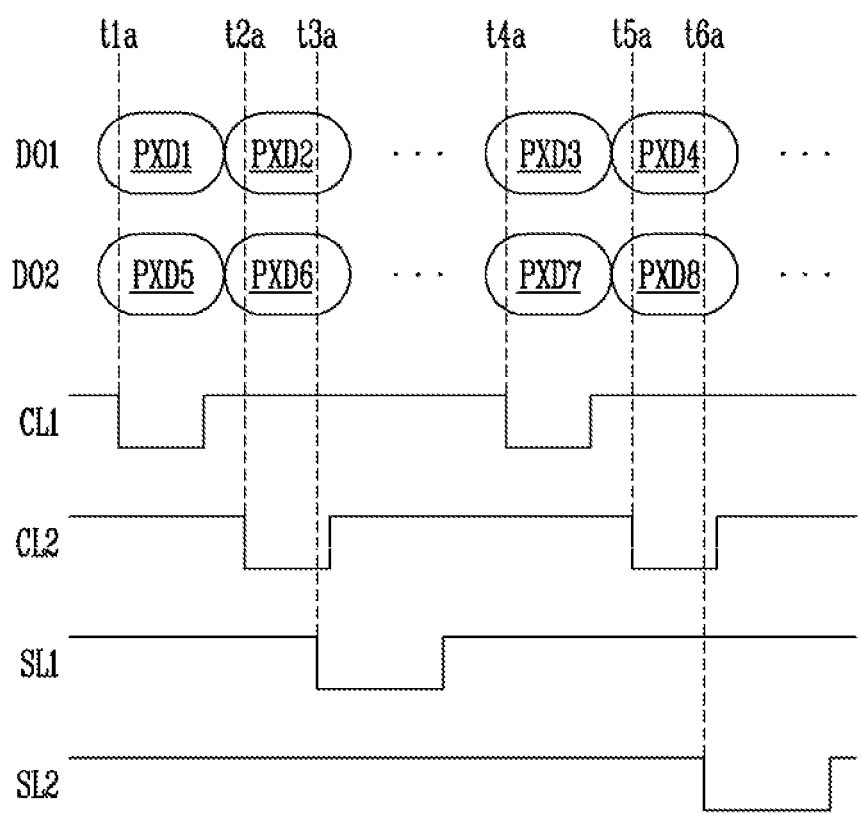
FIG. 5 illustrates an embodiment of a method of driving a pixel unit and a data divider of a display device.

FIG. 5 is a timing diagram corresponding to one embodiment of a driving method of the pixel unit 14 and the data divider 15.

Referring to FIG. 5, at a time t1a, a first control signal of a turn-on level (e.g., low level) may be applied to the first control line CL1. Accordingly, the first transistors M11, M12, . . . are turned on, a first data output line DO1 and the first data line DL1 are connected to each other, and a second data output line DO2 and the first data line DL3 are connected to each other. The data driver 12 may output a first data signal PXD1 to the first data output line DO1 and may output a first data signal PXD5 to the second data output line DO2. Therefore, the first data line DL1 may be charged with the first data signal PXD1, and the first data line DL3 may be charged with the first data signal PXD5. A period from the time t1a to a time at which the first control signal of a turn-off level is applied may be referred to as a first period.

At a time t2a, a second control signal of the turn-on level may be applied to the second control line CL2. Accordingly, the second transistors M21, M22, . . . are turned on, the first data output line DO1 and the second data line DL2 are connected to each other, and the second data output line DO2 and the second data line DL4 are connected to each other. The second data line DL2 may be charged with a second data signal PXD2, and the second data line DL4 may be charged with a second data signal PXD6. A period from the time t2a to a time at which the second control signal of the turn-off level is applied may be referred to as a second period.

At a time t3a, a first scan signal of the turn-on level may be applied to the first scan line SL1. Accordingly, the first pixels PX1, PX2, PX5, PX6, . . . may receive data signals charged in the first data lines DL1, DL3, . . . and the second data lines DL2, DL4, . . . . In this embodiment, the time t3a may be located in the second period, but may be located in a different period in another embodiment.

At a time t4a, the first control signal of the turn-on level may be applied to the first control line CL1. Accordingly, the first transistors M11, M12, . . . are turned on, the first data output line DO1 and the first data line DL1 are connected to each other, and the second data output line DO2 and the first data line DL3 are connected to each other. The first data line DL1 may be charged with a third data signal PXD3, and the first data line DL3 may be charged with a third data signal PXD7. A period from the time t4a to a time at which the first control signal of the turn-off level is applied may be referred to as a third period.

At a time t5a, the second control signal of the turn-on level may be applied to the second control line CL2. Accordingly, the second transistors M21, M22, . . . are turned on, the first data output line DO1 and the second data line DL2 are connected to each other, and the second data output line DO2 and the second data line DL4 are connected to each other. The second data line DL2 may be charged with a fourth data signal PXD4, and the second data line DL4 may be charged with a fourth data signal PXD8. A period from the time t5a to a time at which the second control signal of the turn-off level is applied may be referred to as a fourth period.

At a time t6a, a second scan signal of the turn-on level may be applied to the second scan line SL2. Accordingly, the second pixels PX3, PX4, PX7, PX8, . . . may receive data signals charged in the first data lines DL1, DL3, . . . and the second data line DL2, DL4, . . . . In this embodiment, the time t6a may be located in the fourth period, but may be located in a different period in another embodiment.

In one embodiment, when the channel number of the data driver 12 is sufficient (e.g., when the number of channels of the data driver 12 is equal to or greater than the number of the data lines), the data divider 15 may be omitted. In one embodiment, when a plurality of data drivers 12 are used, the data divider 15 may be omitted. Also, a pixel circuit having a structure different from that shown in FIG. 4 may be used in other embodiments.

Figure 6:
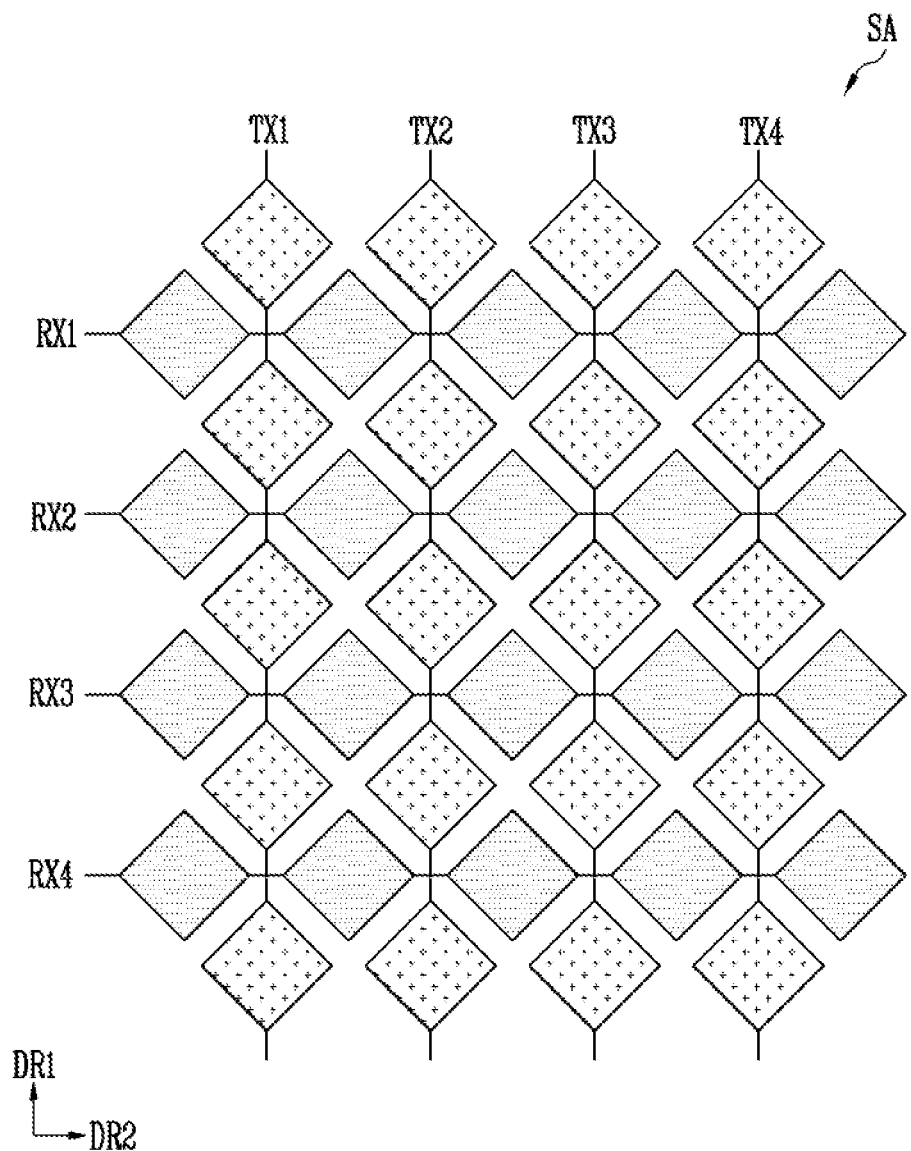
FIG. 6 illustrates an embodiment of first and second sensors.

FIG. 6 is a diagram illustrating first sensors and second sensors in accordance with an embodiment. Referring to FIG. 6, the first sensors (e.g., TX1, TX2, TX3, and TX4) and the second sensors (e.g., RX1, RX2, RX3, and RX4) are located in the sensing area SA. For convenience of description, it is assumed that four first sensors TX1 to TX4 and four second sensors RX1 to RX4 are disposed in the sensing area SA. The first sensors TX1 to TX4 and the second sensors RX1 to RX4 may correspond, for example, to those of the first sensors TX and the second sensors RX described for FIG. 1.

Figure 7:
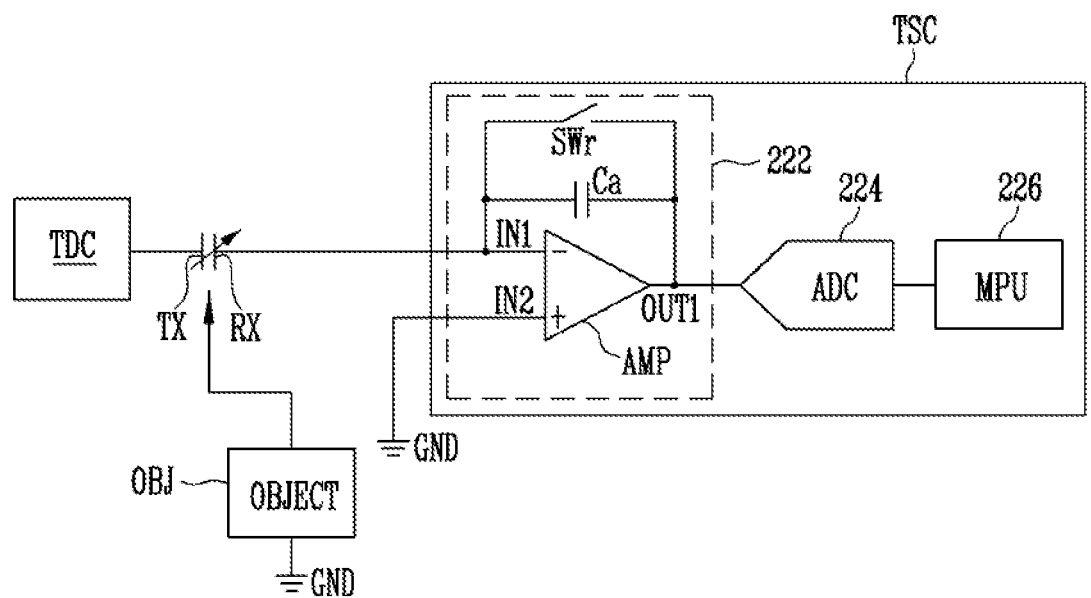
FIGS. 7 and 8 illustrate an embodiment of a mutual sensing period.
Figure 8:
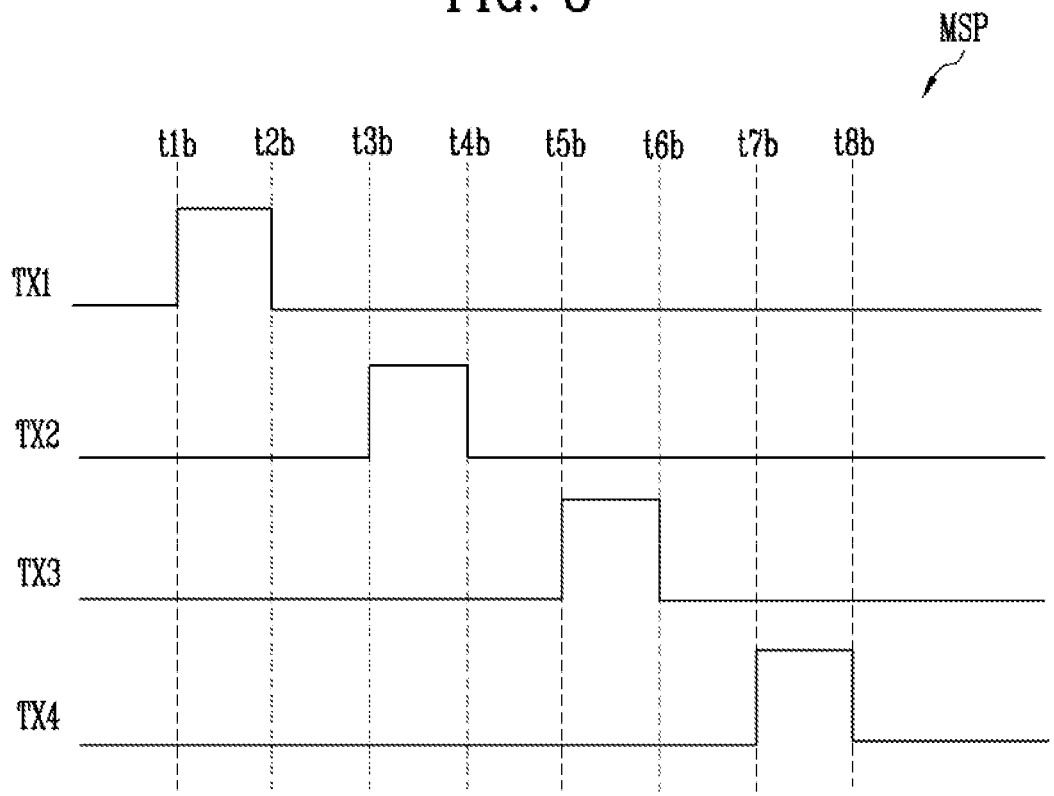

FIG. 7 is a diagram illustrating an embodiment of a sensor driver, and FIG. 8 is a diagram illustrating an embodiment of mutual sensing period MSP. The mutual sensing period MSP may be a period in which, for example, the sensor unit 120 and the sensor driver 220 are driven in a mutual capacitance mode. In the embodiment of FIG. 7, a configuration of the sensor unit 120 and the sensor driver 220 are illustrated based on a representative one of the sensor channels 222.

Referring to FIG. 7, the sensor driver 220 may include a sensor receiver TSC and a sensor transmitter TDC. In the mutual sensing period MSP, the sensor transmitter TDC may be connected to first sensors TX and the sensor receiver TSC may be connected to second sensors RX.

In this embodiment, the sensor receiver TSC may include an operational amplifier AMP, an analog-digital converter 224, and a processor 226. In an example, each sensor channel 222 may be implemented to include an Analog Front End (AFE) having or coupled to at least one operational amplifier AMP. The analog-digital converter 224 and the processor 226 may be provided in each sensor channel 222 and may be shared by a plurality of sensor channels 222.

The operational amplifier AMP may have a first input terminal IN1 connected to a corresponding second sensor and a second input terminal IN2 may be connected to a reference power source (e.g., GND). For example, the first input terminal IN1 may be an inverting terminal and the second input terminal IN2 may be a non-inverting terminal. The reference power source GND may be a ground voltage or a voltage of a specific magnitude corresponding to another type of reference potential.

The analog-digital converter 224 may be connected to an output terminal OUT1 of the operational amplifier AMP. A capacitor Ca and a switch SWr may be connected in parallel between the first input terminal IN1 and the output terminal OUT1.

Referring to FIG. 8, during the mutual sensing period MSP, the sensor driver 220 (e.g., the sensor transmitter TDC) may sequentially supply first sensing signals to the first sensors TX1 to TX4. For example, the sensor driver 220 may supply the first sensing signals to a first sensor TX1 a predetermined number of times (e.g., twice t1$b$ and t2$b$), supply the first sensing signals to a first sensor TX2 a predetermined number of times (e.g., twice t3$b$ and t4$b$), supply the first sensing signals to a first sensor T3 a predetermined number of times (e.g., twice t5$b$ and t6$b$), and supply the first sensing signals to a first sensor T4 a predetermined number of times (e.g., twice t7$b$ and t8$b$). In one embodiment, the number of times the sensing signals are supplied to the aforementioned first sensors may be different from one another. Also, in one embodiment, the number of times the sensor driver 220 supplies the first sensing signals to each of the first sensors TX1 to TX4 may be greater than twice.

Each of the first sensing signals may correspond to a rising transition and/or a falling transition. For example, a first sensing signal at time t1$b$ may correspond to the rising transition, e.g., the first sensing signal at time t1$b$ may be increased from a low level to a high level. A first sensing signal at time t2$b$ may correspond to the falling transition, e.g., the first sensing signal at time t2$b$ may be decreased from the high level to the low level.

The sensor receiver TSC may include a plurality of sensor channels 222 connected to a plurality of second sensors RX. Each of the sensor channels 222 may receive first sampling signals corresponding to the first sensing signals from a corresponding second sensor. For example, sensor channels 222 connected to second sensors RX1 to RX4 may independently receive first sampling signals, corresponding to the first sensing signal applied to the first sensor TX1 at time t1$b$. In addition, sensor channels 222 connected to the second sensors RX1 to RX4 may independently receive first sampling signals, corresponding to the first sensing signal applied to the first sensor TX1 at time t2$b$.

In the sensing area SA, mutual capacitances between the first sensors TX1 to TX4 and the second sensors RX1 to RX4 may be different from each other, for example, according to the position of an object OBJ (e.g., a finger of a user, stylus pen, or other object creating a touch input). Accordingly, the first sampling signals received by the sensor channels 222 may be different from each other. The touch position of the object OBJ may be detected, for example, based on a difference between the first sampling signals.

The sensor channel 222 may generate an output signal corresponding to a voltage difference between the first and second input terminals IN1 and IN2. For example, the sensor channel 222 may amplify a difference voltage between the first and second input terminals IN1 and IN2 to a degree corresponding to a predetermined gain. The amplified difference voltage may then be output.

In some embodiments, the sensor channel 222 may be implemented as an integrator. The capacitor Ca and the switch SWr may be connected in parallel to each other between the first input terminal IN1 and the output terminal OUT1 of the operational amplifier AMP. For example, charges of capacitor Ca may be initialized by turning on the switch SWr before a first sampling signal is received. The switch SWr may be in a turn-off state at a time at which the first sampling signal is received.

The analog-digital converter 224 converts an analog signal input from the sensor channel(s) 222 to a digital signal. The processor 226 may detect a user input by analyzing the digital signal.

Figure 9:
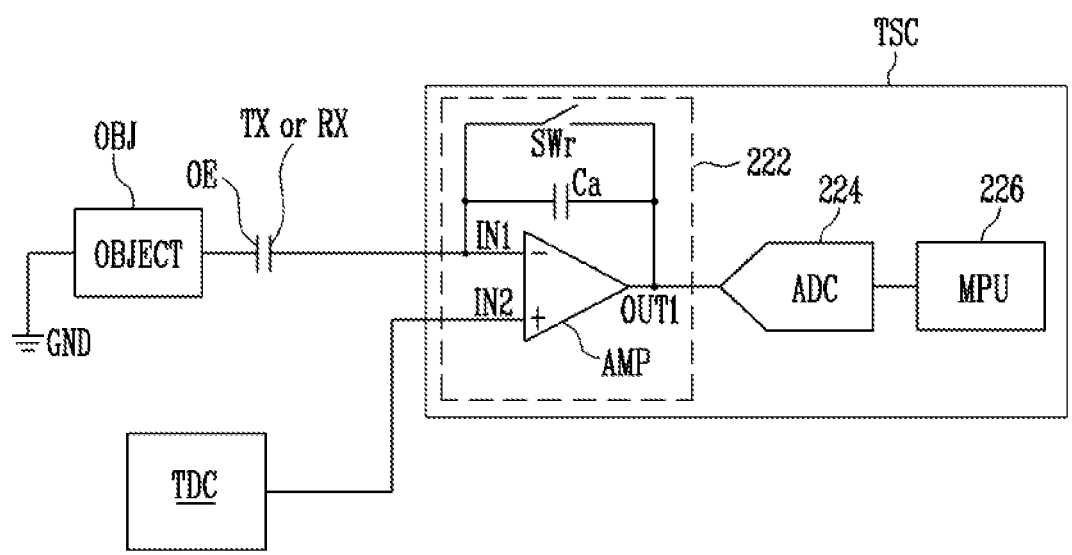
FIGS. 9 to 11 illustrate an embodiment of a first self-sensing period and a second self-sensing period.
Figure 10:
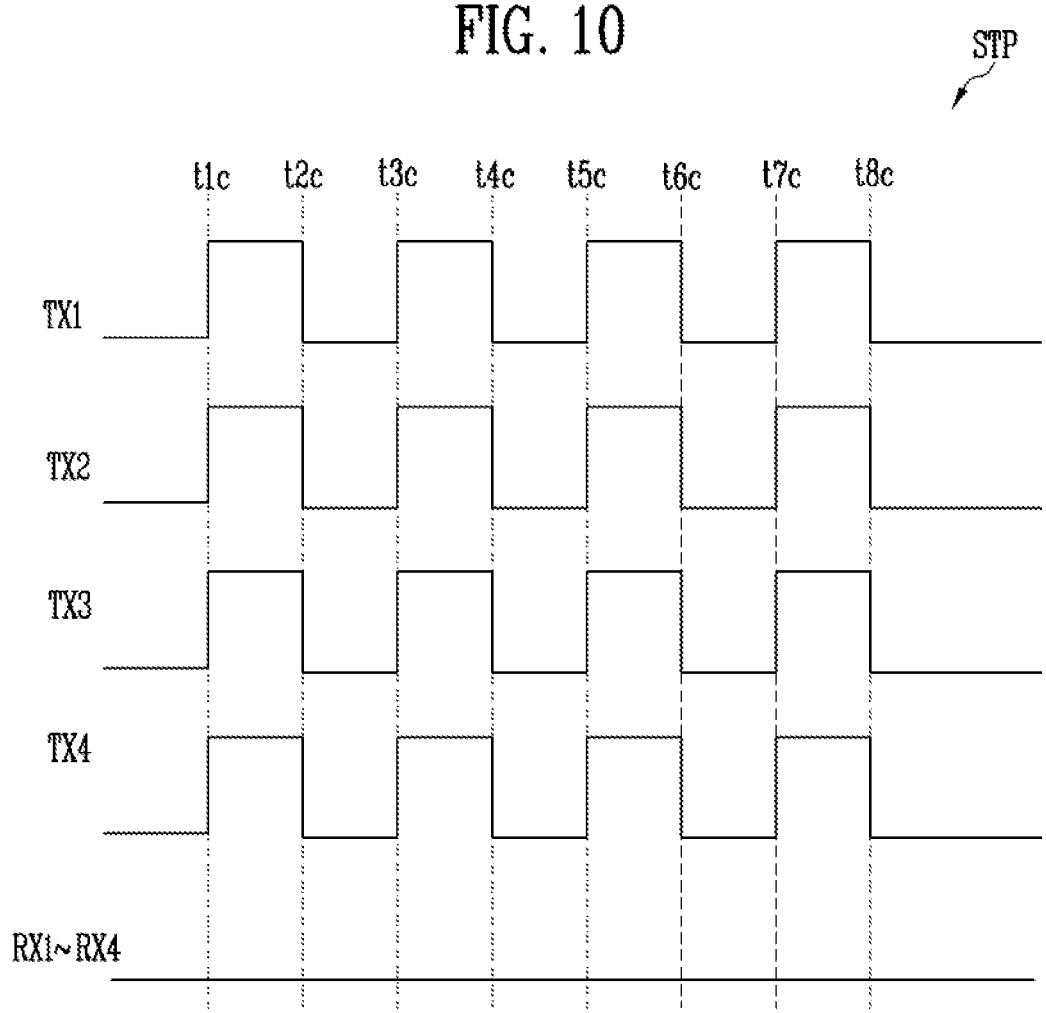
Figure 11:
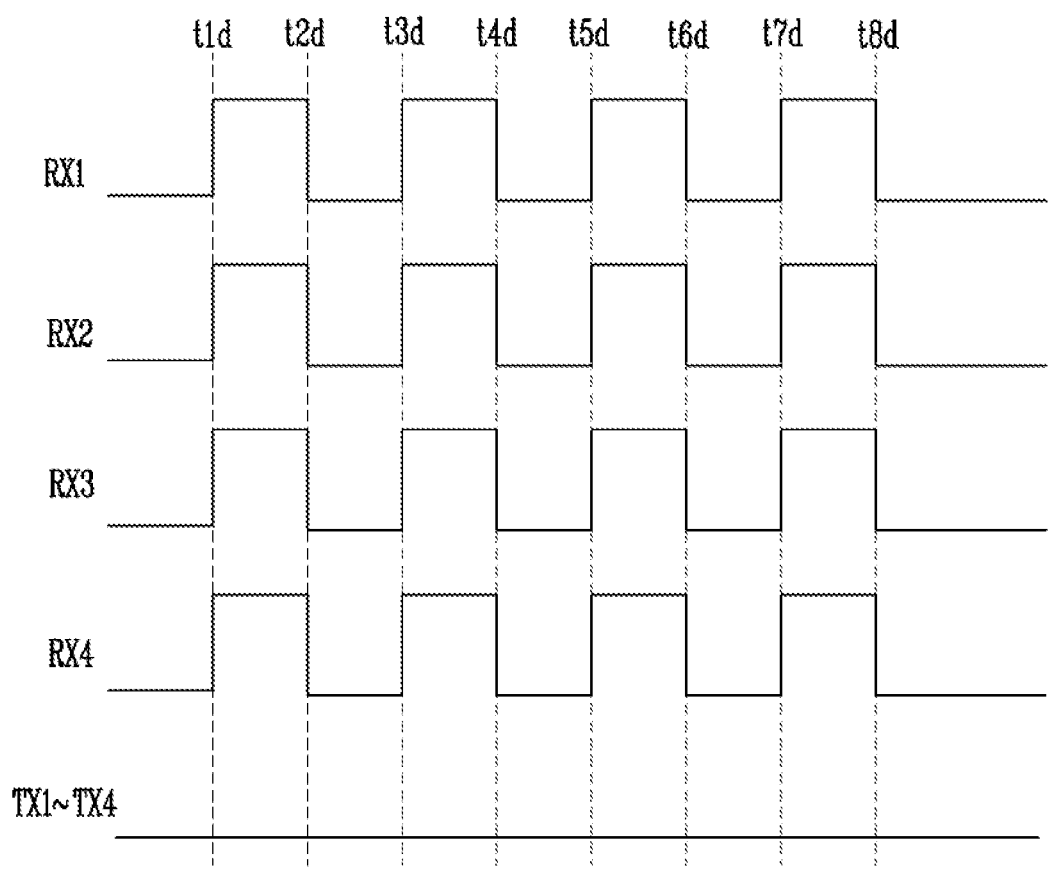

FIGS. 9 to 11 are diagrams illustrating the sensor unit 120, sensor driver 220, a first self-sensing period and a second self-sensing period in accordance with an embodiment.

Referring to FIG. 9, a configuration of the sensor unit 120 and the sensor driver 220 will be illustrated based on any one sensor channel 222. Internal configurations of the sensor receiver TSC and sensor transmitter TDC may correspond to those of the sensor receiver TSC and the sensor transmitter TDC of FIG. 7. Hereinafter, portions different from those shown in FIG. 7 will be mainly described.

Referring to FIG. 10, the first self-sensing period STP may be a period in which the sensor unit 120 and the sensor driver 220 are driven in a self-capacitance mode. In the first-self sensing period STP, the sensor transmitter TDC may be connected to the second input terminal IN2 of each sensor channel 22, and a corresponding first sensor may be connected to the first input terminal IN1 of each sensor channel 222.

For example, during the first self-sensing period STP, the sensor transmitter TDC may supply a second sensing signal to the second input terminal IN2 of the each sensor channel 222. The second sensing signal may be supplied to the first sensor connected to the first input terminal IN1 according to a characteristic of the operational amplifier AMP. In an embodiment, the sensor driver 220 may simultaneously supply second sensing signals to the first sensors TX1 to TX4 during the first self-sensing period STP. For example, referring to FIG. 10, second sensing signals at each of times t1$c$, t2$c$, t3$c$, t4$c$, t5$c$, t6$c$, t7$c$, and t8$c$ may be simultaneously supplied to the first sensors TX1 to TX4. The second sensors RX1 to RX4 may receive a separate reference voltage or be in a floating state. Each of the second sensing signals may correspond to a rising transition and/or a falling transition.

The first sensors TX1 to TX4 may have a self-capacitance. When an object OBJ (e.g., a finger of a user) comes close (e.g., to within a predetermined distance greater than or equal to zero) to the first sensors TX1 to TX4, the self-capacitance of the first sensors TX1 to TX4 may be changed according to a capacitance formed with an object surface OE. The second sensing signal to which the self-capacitance is reflected may be referred to as a second sampling signal. A touch position of the object OBJ with respect to the second direction DR2 may be detected based on a difference between the second sampling signals of the first sensors TX1 to TX4 (e.g., see FIG. 6).

Referring to FIG. 11, the second self-sensing period SRP may be a period in which the sensor unit 120 and the sensor driver 220 are driven in a self-capacitance mode. In the second-self sensing period SRP, the sensor transmitter TDC may be connected to the second input terminal IN2 of each sensor channel 22, and a corresponding second sensor may be connected to the first input terminal IN1 of each sensor channel 222.

For example, during the second self-sensing period SRP, the sensor transmitter TDC may supply a third sensing signal to the second input terminal IN2 of the each sensor channel 222. The third sensing signal may be supplied to the second sensor connected to the first input terminal IN1 according to a characteristic of the operational amplifier AMP. In an embodiment, the sensor driver 220 may simultaneously supply third sensing signals to the second sensors RX1 to RX4 during the second self-sensing period SRP. For example, referring to FIG. 11, third sensing signals at each of times t1d, t2d, t3d, t4d, t5d, t6d, t7d, and t8d may be simultaneously supplied to the second sensors RX1 to RX4. The first sensors TX1 to TX4 may receive a separate reference voltage or be in the floating state. Each of the third sensing signals may correspond to a rising transition and/or a falling transition.

The second sensors RX1 to RX4 may have a self-capacitance. When an object OBJ (e.g., a finger of a user, stylus pen, or other object) comes close to the second sensors RX1 to RX4 (e.g., to within a predetermined distance greater than or equal to zero), the self-capacitance of the second sensors RX1 to RX4 may be changed according to a capacitance formed with an object surface OE. The third sensing signal to which the self-capacitance is reflected may be referred to as a third sampling signal. A touch position of the object OBJ with respect to the first direction DR1 may be detected based on a difference between the third sampling signals of the second sensors RX1 to RX4 (e.g., see FIG. 6).

Figure 12:
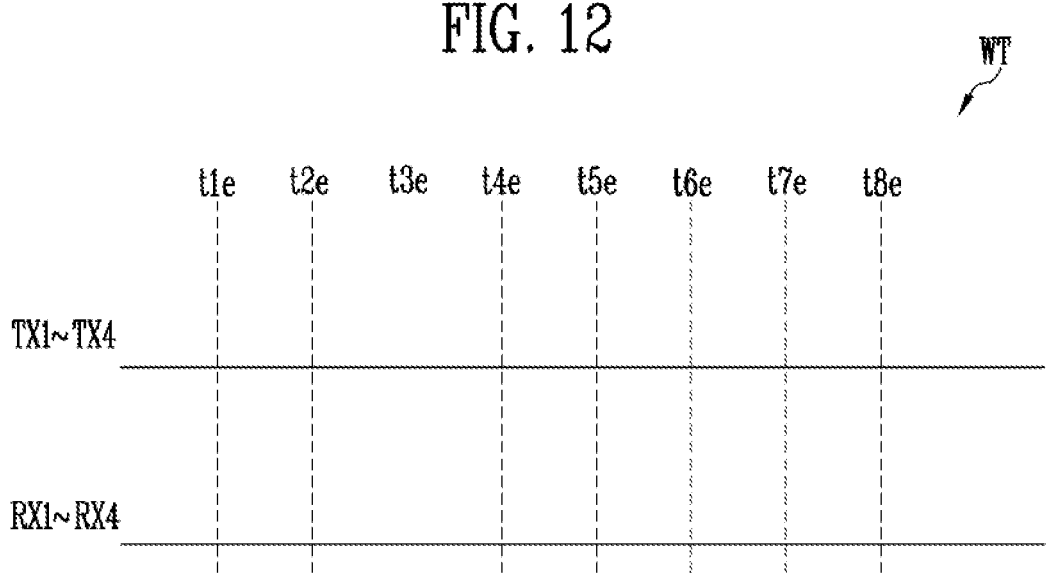
FIG. 12 illustrate an embodiment of a non-sensing period.

FIG. 12 is a diagram illustrating an embodiment of a non-sensing period WT, which may be a period in which no sensing signals are supplied to the first sensors TX1 to TX4 and the second sensors RX1 to RX4. For example, referring to times t1e, t2e, t3e, t4e, t5e, t6e, t7e, and t8e, the first sensors TX1 to TX4 and the second sensors RX1 to RX4 may receive a separate reference voltage or be in the floating state. The non-sensing period WT may be a period in which sensing is unnecessary or otherwise not performed. In one embodiment, the non-sensing period WT may be a period in which a touch position in a corresponding sensing frame period is detected based on sampling signals generated in a sensing period.

Figure 13:
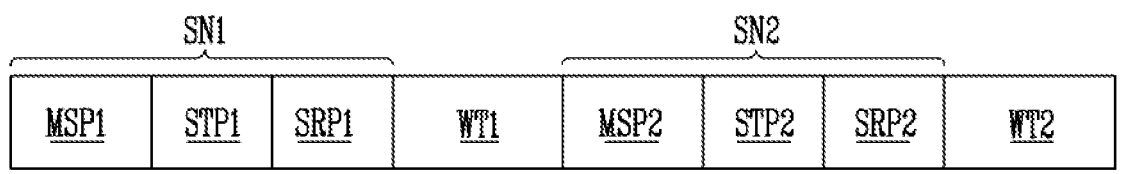
FIGS. 13 to 15 illustrate an embodiment of a relationship between a sensing period and a non-sensing period.
Figure 14:
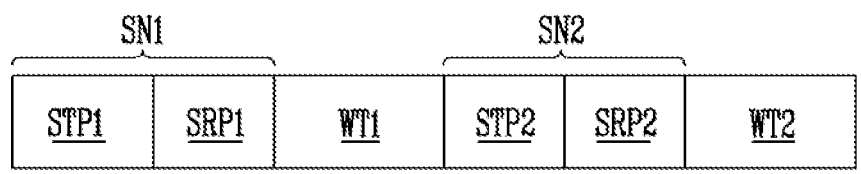
Figure 15:
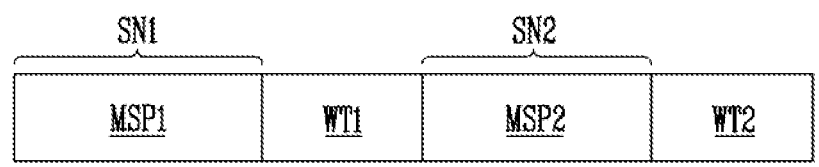

FIGS. 13 to 15 are diagrams illustrating one or more embodiments of a relationship between the sensing period(s) and non-sensing period(s). In FIGS. 13 to 15, sensing periods SN1 and SN2 and non-sensing periods WT1 and WT2 may be alternately located. A first sensing frame period may include a first sensing period SN1 and a first non-sensing period WT1. A second sensing frame period may include a second sensing period SN2 and a second non-sensing period WT2.

Referring to FIG. 13, the first sensing period SN1 may include a mutual sensing period MSP1, a first self-sensing period STP1, and a second self-sensing period SRP1. In addition, the second sensing period SN2 may include a mutual sensing period MSP2, a first self-sensing period STP2, and a second self-sensing period SRP2.

For example, the case is shown where a water drop falls in a partial area of the sensing area SA and a touch of a user is input to another partial area of the sensing area SA. When the first sensing period SN1 includes only the mutual sensing period MSP1, the position of the water drop and the position of the touch can be accurately sensed, but the water drop and the touch may not be distinguished from each other.

To distinguish between the touch of the user and the water drop, the first self-sensing period STP1 and the second self-sensing period SRP1 may be provided. The touch position of the user may be roughly sensed by combining the touch position of an object OBJ with respect to the second direction DR2 (which is detected in the first self-sensing period STP1) and the touch position of the object OBJ with respect to the first direction DR1 (which is detected in the second self-sensing period SRP1). The position of the water drop in the first self-sensing period STP1 and the second self-sensing period SRP2 may not be sensed.

Therefore, a result obtained that excludes sensing the water drop in the mutual sensing period MSP1 using the first and second self-sensing periods STP1 and SRP1. The touch position of the user can therefore be accurately sensed.

In some embodiments (e.g., as shown in FIG. 14), the sensing periods SN1 and SN2 may include only the first self-sensing periods STP1 and STP2 and the second self-sensing periods SRP1 and SRP2, respectively. In some embodiments (e.g., as shown in FIG. 15), the sensing periods SN1 and SN2 may include only the mutual sensing periods MSP1 and MSP2, respectively.

Figure 16:
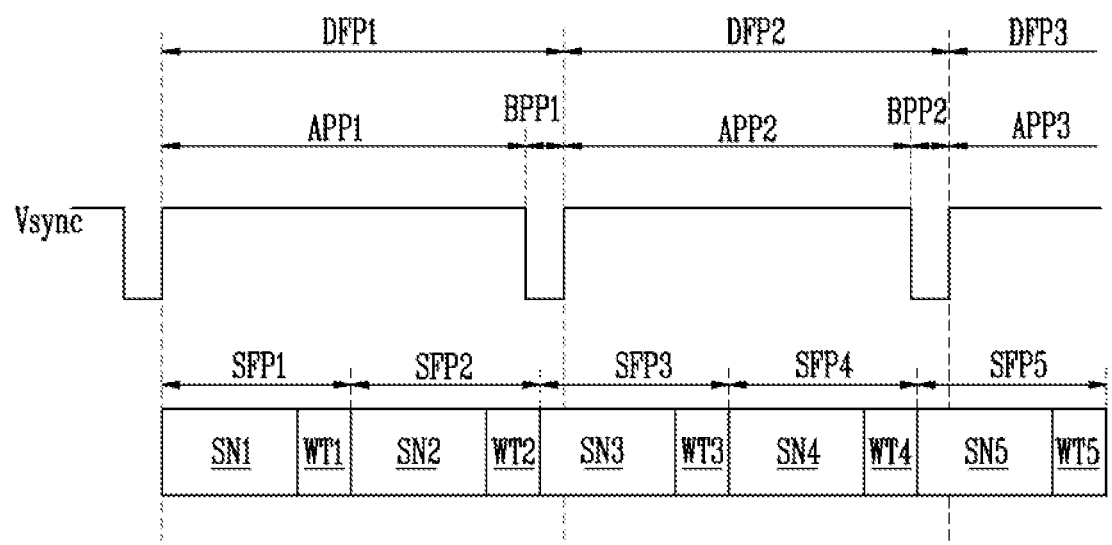
FIGS. 16 and 17 illustrate a case where a display device uses a sensing method in accordance with a comparative example.
Figure 17:
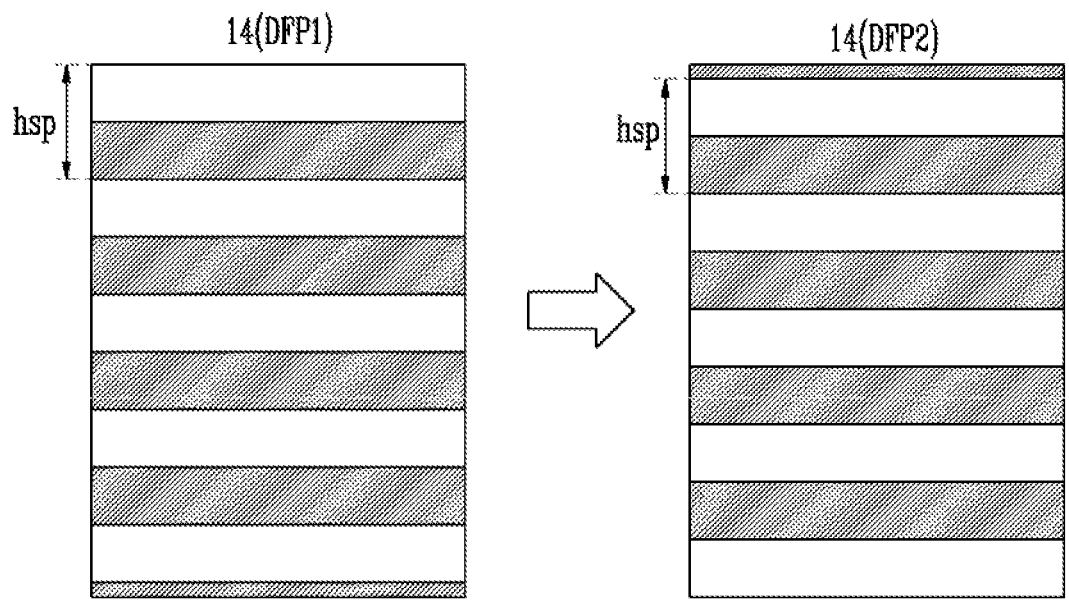

FIGS. 16 and 17 are diagrams illustrating a case where the display device uses a sensing method in accordance with a comparative example. Referring to FIG. 16, example display frame periods DFP1, DFP2, and DFP3 and example sensing frame periods SFP1, SFP2, SFP3, SFP4, and SFP5 are illustrated. The display frame periods DFP1, DFP2, and DFP3 may include active periods APP1, APP2, and APP3 in which grayscale values for the pixels PXL are supplied and blank periods BPP1 and BPP2 in which the grayscale values are not supplied. For example, when a vertical synchronization signal Vsync has a logic high level, the vertical synchronization signal Vsync may indicate the active periods APP1, APP2, and APP3. When the vertical synchronization signal Vsync has a logic low level, the vertical synchronization signal Vsync may indicate the blank periods BPP1 and BPP2.

The sensing frame periods SFP1, SFP2, SFP3, SFP4, and SFP5 may respectively include sensing periods SN1, SN2, SN3, SN4, and SN5 (in which sensing signals are supplied to the sensors TX1 to TX4 or RX1 to RX4) and non-sensing periods WT1, WT2, WT3, WT4, and WT5 in which the sensing signals are not supplied to the sensors TX1 to TX4 or RX1 to RX4. The sensing frame periods SFP1, SFP2, SFP3, SFP4, and SFP5 may be different from (e.g., shorter than) the display frame periods DFP1, DFP2, and DFP3. The sensing frame rate may be greater than the display frame rate.

In the comparative example shown in FIG. 16, lengths of time (e.g., durations) of the non-sensing periods WT1, WT2, WT3, WT4, and WT5 are the same. In addition, lengths of the sensing periods SN1, SN2, SN3, SN4, and SN5 are the same. Therefore, the lengths of time of the sensing frame periods SFP1, SFP2, SFP3, SFP4, and SFP5 may be the same.

Referring to FIG. 17, an example of a horizontal stripe pattern is illustrated for the pixel unit 14 in a first display frame period DFP1. The horizontal stripe pattern may occur as a result of display signals of the display unit 110 interfering with sensing signals of the sensor unit 120. In one case, the voltage level of a data signal is changed while being coupled to a transition of the sensing signals, producing the horizontal stripe pattern.

The cycle hsp and thickness of the horizontal stripe pattern may be predicted by the sensing signals of the sensor unit 120 and the display signals of the display unit 110. For example, the horizontal stripe pattern may be predicted (e.g., simulated) by the frequency and/or phase of control signals of the control line CL1 and CL2 shown in FIG. 5, scan signals of the scan lines SL1, SL2, . . . , sensing signals of the sensors TX1 to TX4 and RX1 to RX4 shown in FIGS. 8 to 12, etc. The cycle hsp and thickness of the horizontal stripe pattern may be actually measured by being photographed using an optical photographing device. The prediction and actual measurement may be performed in parallel.

When viewed in the pixel unit 14 in a second display frame period, the horizontal stripe pattern DFP2 may have a changed phase while maintaining the same cycle hsp. Such a phenomenon may result a difference between the sensing frame rate and the display frame rate. Therefore, a user may recognize as if the horizontal stripe pattern flows downwardly as time elapses.

Figure 18:
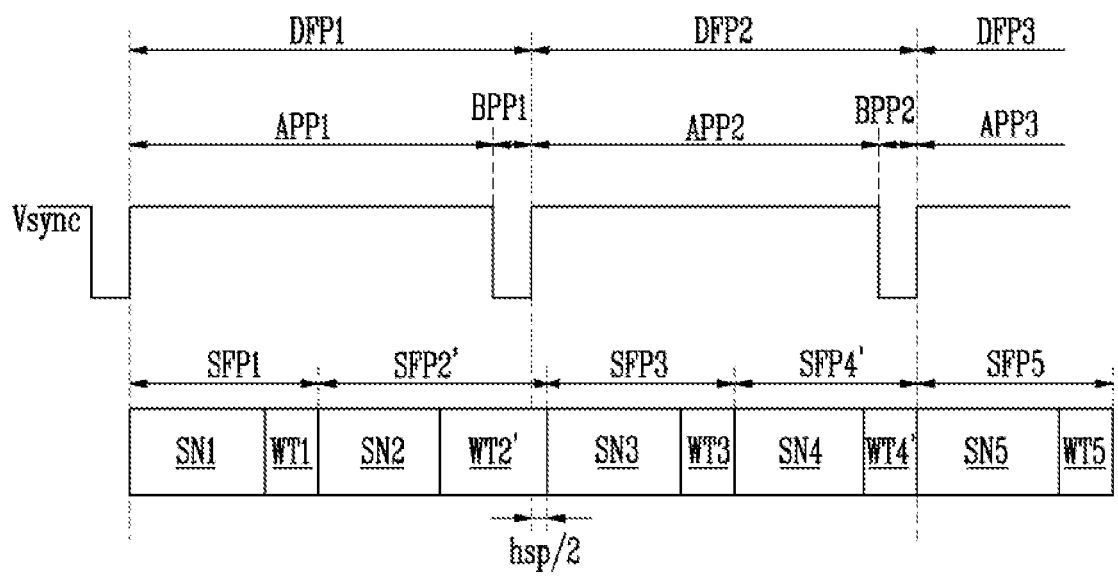
FIGS. 18 and 19 illustrate a case where a display device uses a sensing method in accordance with an embodiment.
Figure 19:
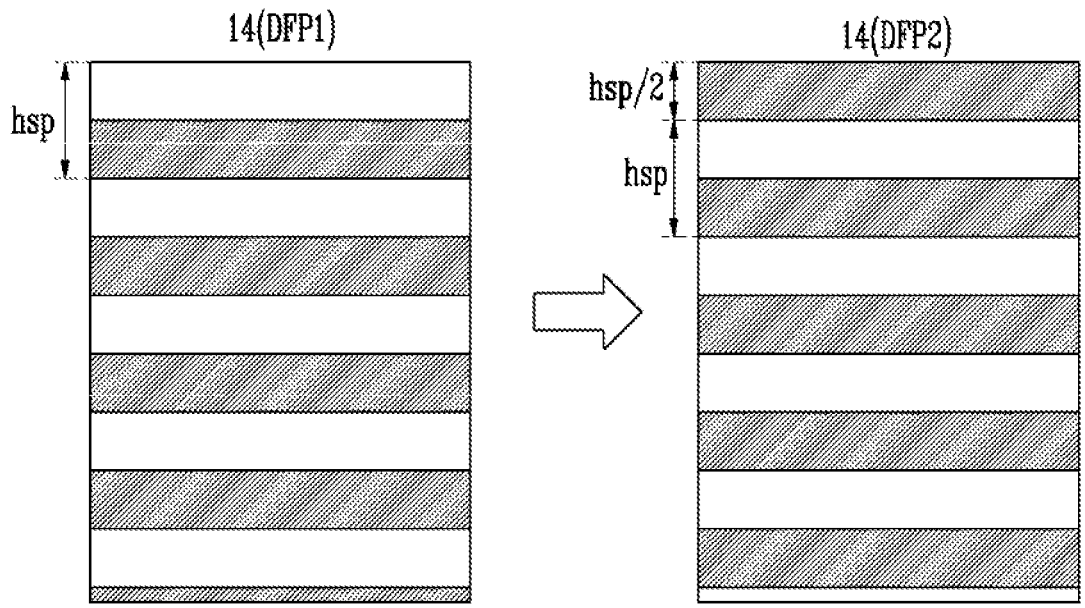

FIGS. 18 and 19 are diagrams illustrating an example of when the display device uses a sensing method in accordance with one or more of the embodiments described herein.

Referring to FIG. 18, the lengths of sensing periods SN1, SN2, SN3, SN4, and SN5 in sensing frame periods SFP1, SFP2, SFP3, SFP4, and SFP5 may be the same. However, in this embodiment, the lengths of time of some non-sensing periods may be different from each other.

A first non-sensing period WT1 of a first sensing frame period SFP1 may entirely or substantially overlap with a first display frame period DFP1. The first non-sensing period WT1 may entirely or substantially overlap with a first active period APP1 of the first display frame period DFP1.

A second non-sensing period WT2' of a second sensing frame period SFP2' may overlap with a portion of the first display frame period DFP1 and a portion of a second display frame period DFP2. The second non-sensing period WT2' may partially overlap with a first blank period BFP1 of the first display frame period DFP1. The second non-sensing period WT2' may partially overlap with a second active period APP2 of the second display frame period DFP2. Thus, the second non-sensing period WT2' may be a non-sensing period in a transition period in which the display frame period is changed from the first display frame period DFP1 to the second display frame period DFP2.

The lengths of the first non-sensing period WT1 and the second non-sensing period WT2' may be different from each other. For example, when assuming that a difference between a start time of the first display frame period DFP1 and a start time of a first sensing period SN1 is a variable x, an end time of the second non-sensing period WT2' may be set to be different by y from a start time of the second display frame period DFP2 (e.g., see Equation 1).

$$y = x + (hsp/2)*odv \quad (1)$$

where odv may be an odd number integer and hsp/2 may be a half cycle hsp/2 of the horizontal stripe pattern.

In FIG. 18, the example case of where x is 0 and odv is 1 is illustrated. Therefore, with respect to the start time of each display frame period, the start time of a third sensing period SN3 may be delayed by a cycle hsp/2 from the start time of the first sensing period SN1. Accordingly, a horizontal stripe pattern of the second display frame period DFP2 may be displayed by being delayed by a cycle hsp/2, as compared with a horizontal stripe pattern of the first display frame period DFP1.

Referring to FIG. 19, an example is illustrated where a bright portion of the horizontal stripe pattern of the first display frame period DFP1 is cancelled with a dark portion of the horizontal stripe pattern of the second display frame period DFP2. Also, it is illustrated that a dark portion of the horizontal stripe pattern of the first display frame period DFP1 can be cancelled with a bright portion of the horizontal stripe pattern of the second display frame period DFP2. Accordingly, even though the sensing frame rate is different from the display frame rate, a horizontal stripe pattern can be reduced or prevented from being viewed.

As described with reference to FIGS. 16 and 17, the cycle hsp and thickness of a horizontal stripe pattern may be predicted and actually measured. Thus, in a factory process before product release, prediction and/or actual measurement of a horizontal stripe pattern are/is performed on sensing signals and display signals (which have various frequencies and various phases), so that information on the cycle hsp of the horizontal stripe pattern can be pre-stored in a look-up table (LUT) in a memory of the display device.

Referring again to FIG. 18, a third non-sensing period WT3 of a third sensing frame period SFP3 may entirely or substantially overlap with a third display frame period DFP3. For example, the third sensing period SN3 and the third non-sensing period WT3 may entirely or substantially overlap with the second active period APP2. Lengths of time (e.g., durations) of the third non-sensing period WT3 and the first non-sensing period WT1 may be the same or substantially the same. For example, lengths of time of non-sensing periods overlapping with display frame periods may be the same or substantially the same. Lengths of the third non-sensing period WT3 and the second non-sensing period WT2, however, may differ from each other.

A fourth non-sensing period WT4' of a fourth sensing frame period SFP4' may overlap with a second blank period BPP2 of the second display frame period DFP2. For example, the fourth non-sensing period WT4' may be determined such that a difference between the start time of the second display frame period DFP2 and a start time of a fifth sensing period SN5 becomes x. In FIG. 18, x may be 0.

Accordingly, with respect to the start time of each display frame period, the start time of the fifth sensing period SN5 may be earlier by a cycle hsp/2 than the start time of the third sensing period SN3. Therefore, a horizontal stripe pattern of the third display frame period DFP3 may be displayed earlier by the cycle hsp/2 than the horizontal stripe pattern of the second display frame period DFP2. Accordingly, the horizontal stripe patterns of the second and third display frame periods DFP2 and DFP3 are cancelled, so that viewing of the horizontal stripe patterns can be reduced or prevented.

In one embodiment, the end time of the fourth non-sensing period WT4' may be set to be different by z from the start time of the third display frame period DFP3 (e.g., see Equation 2).

$$z = x + (hsp/2)*evv \quad (2)$$

where evv may be 0 or an even number integer and x is a difference between the start time of the first display frame period DFP1 and the start time of the first sensing period SN1. In FIG. 18, x and evv are 0.

In the embodiment shown in FIG. 18, for convenience of description, it has been described that the second sensing frame period SFP2' is located after the first sensing frame period SFP1. However, in one embodiment, one or more added sensing frame periods may be located between the first sensing frame period SFP1 and the second sensing frame period SFP2'. Each of the one or more added sensing frame periods may have the same feature as the first sensing frame period SFP1. For example, a sensing period of each of the added sensing frame period(s) may have the same or substantially the same length (e.g., duration) as the first sensing period SN1. Also, a non-sensing period of each of the added sensing frame period(s) may have the same or substantially the same length (e.g., duration) as the first non-sensing period WT1. In one implementation, the added sensing frame period(s) may entirely or substantially overlap with the first active period APP1. In one or more embodiments, the term substantially the same may mean within a predetermined tolerance. The tolerance may be, for example, a predetermined percentage of the term being modified by substantially.

Similarly, the one or more added sensing frame period may be located between the third sensing frame period SFP3 and the fourth sensing frame period SFP4'. In one embodiment, each of the added sensing frame period(s) may have the same feature as the third sensing frame period SFP3.

Figure 20:
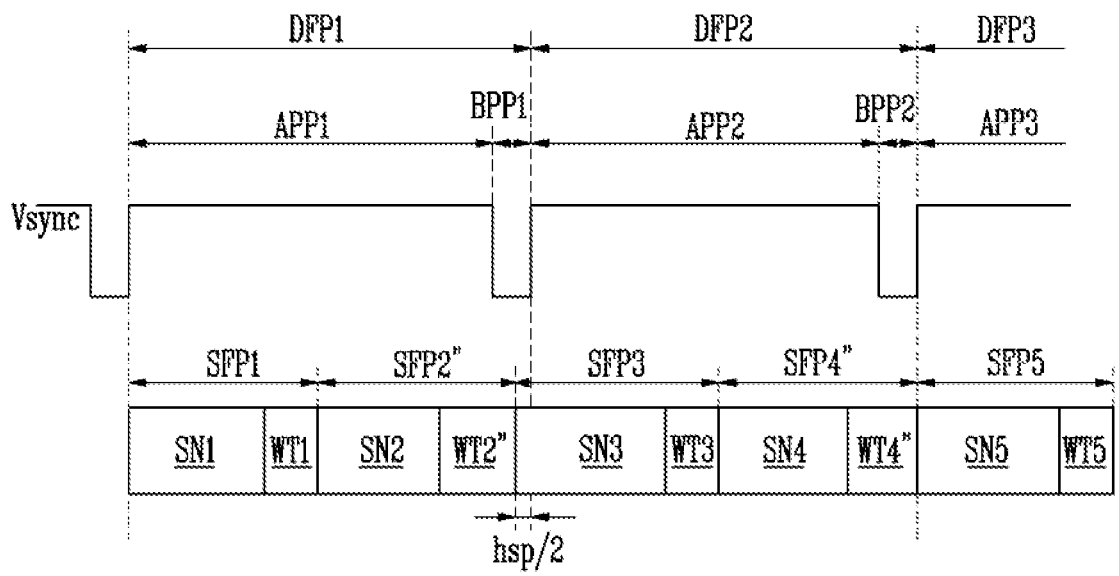
FIG. 20 illustrate a case where a display device uses a sensing method in accordance with an embodiment.

FIG. 20 is a diagram illustrating a case where the display device uses a sensing method in accordance with an embodiment.

Referring to FIG. 20, a second non-sensing period WT2" of a second sensing frame period SFP2" may entirely or substantially overlap with a first display frame period DFP1. The second non-sensing period WT2" may be a last non-sensing period of the first display frame period DFP1.

Lengths of a first non-sensing period WT1 and the second non-sensing period WT2" may be different from each other. When assuming that a difference between the start time of the first display frame period DFP1 and the start time of a first sensing period SN1 is a variable x, the end time of the second non-sensing period WT2" may be set to be different by y from the start time of a second display frame period DFP2 (e.g., see Equation 3).

$$y = x - (hsp/2)*odv \quad (3)$$

where x is a difference between the start time of the first display frame period DFP1 and the start time of the first sensing period SN1, odv may be an odd number integer, and hsp/2 may be a half cycle hsp/2 of a horizontal stripe pattern. In FIG. 20, the example case where x is 0 and odv is 1 is illustrated. Accordingly, an effect substantially identical to that shown in FIG. 19 can be exhibited.

The first non-sensing period WT1 may entirely or substantially overlap with a first active period APP1 of the first display frame period DFP1.

The second non-sensing period WT2" may partially overlap with a first blank period BPP1 of the first display frame period DFP1.

A third non-sensing period WT3 of a third sensing frame period SN3 may entirely or substantially overlap with the second display frame period DFP2. Lengths of the third non-sensing period WT3 and the first non-sensing period WT1 may be the same. Lengths of the third non-sensing period TW3 and the second non-sensing period TW2" may be different from each other.

The third sensing period SN3 may partially overlap with the first bank period BPP1. The third non-sensing period WT3 may entirely or substantially overlap with a second active period APP2.

The end time of a fourth non-sensing period WT4" may be set to be different by z from the start time of a third display frame period DFP3 (e.g., see Equation 4).

$$z = x - (hsp/2)*evv \quad (4)$$

where x is a difference between the start time of the first display frame period DPF1 and the start time of the first sensing period SN1 and evv may be 0 or an even number integer. For example, in FIG. 20, x and evv are 0.

The embodiments shown in FIGS. 18 and 20 may be combined with each other to form an additional embodiment. For example, in this combined embodiment, Equation 1 or Equation 3 may be selectively applied to the second non-sensing period WT2' or WT2" and Equation 2 or Equation 4 may be selectively applied to the fourth non-sensing period WT4' and WT4".

In accordance with one embodiment, an apparatus includes a first driver and a second driver. The apparatus may be, for example, a processor or a controller in or coupled to the display device as described herein. The first driver controls a display panel in display frame periods, and the second driver controls a touch sensor in sensing frame periods. The first driver may be the display driver and the second driver may be the sensor driver in accordance with any of the embodiments described herein.

The display frame periods may include any of the periods described in accordance with the embodiments herein, and the sensing frame periods may include any of the periods described in accordance with the embodiments herein. For example, a first sensing frame period may include a first non-sensing period that entirely or substantially overlaps with a first display frame period. A second sensing frame period may include a second non-sensing period that overlaps with a portion of the first display frame period and a portion of a second display frame period. The first non-sensing period and the second non-sensing period are of different durations.

Additionally, the first driver may control the display panel at a display frame rate and the second driver may control the touch sensor at a sending frame rate. The display frame rate may be the same or different from the sensing frame rate. As previously discussed, the first driver and the second driver may be included in the same integrated circuit chip or may be included in different integrated circuit chips.

In accordance with one or more of the aforementioned embodiments, a display device is provided which can reduce or prevent a flowing horizontal stripe pattern from being viewed, even when the sensing frame rate and the display frame rate are not in accordance with each other.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, drivers, units, multiplexers, dividers, logic, converters, and other signal generating and signal processing features of the embodiments disclosed herein may be implemented, for example, in non-transitory logic that may include hardware, software, or both. When implemented at least partially in hardware, the controllers, processors, devices, drivers, units, multiplexers, dividers, logic, converters, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, drivers, units, multiplexers, dividers, logic, converters, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device, comprising:
pixels configured to display one or more images in display frame periods; and
sensors overlapping with the pixels, the sensors configured to sense one or more user inputs in sensing frame periods shorter in duration than the display frame periods, each of the sensing frame periods including sensing periods in which sensing signals are supplied to the sensors and non-sensing periods in which the sensing signals are not supplied to the sensors, wherein:
a first sensing frame period includes a first non-sensing period that is included within a first display frame period,
a second sensing frame period includes a second non-sensing period that is partially included within a portion of the first display frame period and is partially included within a portion of a second display frame period, and
the first non-sensing period and the second non-sensing period are of different durations.

2. The display device of claim 1, wherein:
the first sensing frame period includes a first sensing period, and
the second sensing frame period includes a second sensing period having a duration which corresponds to a duration of the first sensing period.

3. The display device of claim 2, wherein:
a third sensing frame period includes a third non-sensing period that is included within the second display frame period,
a duration of the third non-sensing period corresponds to a duration of the first non-sensing period, and
the third non-sensing period and the second non-sensing periods have different durations.

4. The display device of claim 3, wherein:
the third sensing frame period includes a third sensing period, and
the first sensing period, the second sensing period, and the third sensing period have corresponding durations.

5. The display device of claim 4, wherein:
the first non-sensing period is included within a first active period of the first display frame period,
the second non-sensing period partially overlaps with a first blank period of the first display frame period, and
grayscale values are to be supplied for the pixels in the first active period and not to be supplied for the pixels in the first blank period.

6. The display device of claim 5, wherein the second non-sensing period partially overlaps with a second active period of the second display frame period.

7. The display device of claim 6, wherein the third sensing period and the third non-sensing period are included within the second active period.

8. The display device of claim 1, wherein:
the sensors include first sensors and second sensors, and
the display device is configured to sequentially supply first sensing signals to the first sensors during at least a portion of one or more of the sensing periods.

9. The display device of claim 8, wherein the display device is configured to simultaneously supply second sensing signals to the first sensors during at least a portion of one or more of the sensing periods.

10. The display device of claim 1, wherein the display device is configured to simultaneously supply third sensing signals during at least a portion of one or more of the sensing periods.

11. A display device, comprising:
pixels configured to display one or more images in display frame periods; and
sensors overlapping with the pixels, the sensors configured to sense one or more user inputs in sensing frame periods shorter in duration than the display frame periods, each of the sensing frame periods including sensing periods in which sensing signals are supplied to the sensors and non-sensing periods in which the sensing signals are not supplied to the sensors, wherein:
a first sensing frame period includes a first non-sensing period that is included within a first display frame period,
a second sensing frame period includes a second non-sensing period that is included within the first display frame period, the second non-sensing period is a last non-sensing period of the first display frame period, and the first non-sensing period and the second non-sensing period have different durations.

12. The display device of claim 11, wherein:

the first sensing frame period includes a first sensing period, the second sensing frame period includes a second sensing period, and the first sensing period and the second sensing period have corresponding durations.

13. The display device of claim 12, wherein:

a third sensing frame includes a third non-sensing period that is included within the second display frame period, the third non-sensing period and the first non-sensing period have corresponding durations, and the third non-sensing period and the second non-sensing periods have different durations.

14. The display device of claim 13, wherein:

the third sensing frame period includes a third sensing period, and the first sensing frame period, the second sensing period, and the third sensing period have corresponding durations.

15. The display device of claim 14, wherein:

the first non-sensing period is included within a first active period of the first display frame period, the second non-sensing period is partially included within a first blank period of the first display frame period, and grayscale values are to be supplied for the pixels in the first active period and not to be supplied for the pixels in the first blank period.

16. The display device of claim 15, wherein the third sensing period is partially included within the first blank period.

17. The display device of claim 16, wherein:

the second display frame period includes a second active period, and the third non-sensing period is included within the second active period of the second display frame period.

18. The display device of claim 11, wherein:

the sensors include first sensors and second sensors, and the display device is configured to sequentially supply first sensing signals to the first sensors during at least a portion of one or more of the sensing periods.

19. The display device of claim 18, wherein the display device is configured to simultaneously supply second sensing signals to the first sensors during at least a portion of one or more of the sensing periods.

20. The display device of claim 19, wherein the display device is configured to simultaneously supply third sensing signals during at least a portion of one or more of the sensing periods.

* * * * *